(12) United States Patent
Wilson

(10) Patent No.: US 8,194,339 B2
(45) Date of Patent: Jun. 5, 2012

(54) WRITE PERFORMANCE MONITOR IN A STORAGE DEVICE

(75) Inventor: Ross Wilson, Menlo Park, CA (US)

(73) Assignee: LSI Corporation, Milpitas, CA (US)

( * ) Notice: Subject to any disclaimer, the term of this patent is extended or adjusted under 35 U.S.C. 154(b) by 14 days.

(21) Appl. No.: 12/846,271

(22) Filed: Jul. 29, 2010

(65) Prior Publication Data

US 2012/0026619 A1 Feb. 2, 2012

(51) Int. Cl.
*G11B 27/36* (2006.01)
*G11B 5/09* (2006.01)

(52) U.S. Cl. .................................. 360/31; 360/46
(58) Field of Classification Search ............... None
See application file for complete search history.

(56) References Cited

U.S. PATENT DOCUMENTS

| 6,353,914 | B1 | 3/2002 | Emerson et al. | 714/799 |
| 6,552,865 | B2 * | 4/2003 | Cyrusian | 360/31 |
| 2003/0030934 | A1 | 2/2003 | Schaff et al. | 360/66 |
| 2009/0284858 | A1 * | 11/2009 | Kawabe | 360/31 |
| 2010/0118433 | A1 * | 5/2010 | Buch | 360/75 |
| 2010/0238575 | A1 * | 9/2010 | Gleason et al. | 360/31 |

OTHER PUBLICATIONS

Kryder, Mark H., et al., "Heat Assisted Magnetic Recording", Proceedings of the IEEE, vol. 96, No. 11, Nov. 2008, pp. 1810-1835

* cited by examiner

*Primary Examiner* — Daniell L Negron
*Assistant Examiner* — Regina N Holder
(74) *Attorney, Agent, or Firm* — Christopher P. Maiorana, PC

(57) ABSTRACT

An apparatus comprising a write circuit, a processing circuit and a monitor circuit. The write circuit may be configured to generate one or more write control signals in response to an input signal. The processing circuit may be configured to generate an intermediate control signal in response to (i) the input signal, (ii) a reference clock signal and (iii) one or more user input signals. The monitor circuit may be configured to generate a sample signal in response to (i) the write control signals and (ii) the intermediate signal. The sample signal may represent a waveshape of the write control signals used to monitor writing to a data storage system.

14 Claims, 10 Drawing Sheets

WRITE PERFORMANCE MONITOR IN A STORAGE DEVICE

FIELD OF THE INVENTION

The present invention relates to data storage generally and, more particularly, to a method and/or apparatus for implementing a write performance monitor in a storage device.

BACKGROUND OF THE INVENTION

Accurate in situ Writer output waveform monitoring (i.e., output waveform monitoring that occurs without interrupting the normal state of a system) is difficult to implement in disc drives for a number of reasons. Such reasons include impaired head disc assembly (HDA) access, the fragile nature of the preamplifier-to-head interconnects, and/or probe loading effects. Several authors have reported application of on-chip eye monitors to serial backplane and wireline communication to solve such problems.

Monitoring capability is valuable to allow monitoring of a write and/or optimization on all heads. Conventional approaches sometimes attempt to introduce test probes into the confined HDA. However, test probes introduce undesirable loading which change the HDA performance. Further, as writer risetimes decrease, laboratory evaluation and production final test of writers is increasingly problematic due to test fixture parasitics. Difficulty in replicating the exact disc drive environment where the writer is used is also a problem. In non-testing environments such as non-laboratory settings, writer performance monitoring sometimes improves yields by allowing direct inspection of such performance aspects as risetime and transmission line reflections.

Other conventional writers employ an adaptive parameter setting that can be mechanized using software-based LMS algorithms implemented in the microcode of the drive to force the measured waveform to a desired shape or by measuring bit error rates. Each head-interconnect-preamplifier channel in a disc drive can automatically be optimized during the final test phase, by variation of parameters available in the chosen writer design. In such conventional writers, optimizable parameters include overshoot amplitude, duration, and steady-state write current.

Conventional implementations for characterizing preamplifier writers use comprehensive measurements in a laboratory setting. Such an approach is not easily implemented in a mass-production environment or to analyses at a particular customer site. A further disadvantage of such an approach is that measurement probes inevitably introduce circuit loading and affect results. A customer application environment is difficult to replicate.

It would be desirable to implement a write performance monitor in an optical or magnetic storage device that provides monitoring without affecting results.

SUMMARY OF THE INVENTION

The present invention concerns an apparatus comprising a write circuit, a processing circuit and a monitor circuit. The write circuit may be configured to generate one or more write control signals in response to an input signal. The processing circuit may be configured to generate an intermediate control signal in response to (i) the input signal, (ii) a reference clock signal and (iii) one or more user input signals. The monitor circuit may be configured to generate a sample signal in response to (i) the write control signals and (ii) the intermediate signal. The sample signal may represent a waveshape of the write control signals used to monitor writing to a data storage system.

The objects, features and advantages of the present invention include providing a write performance monitor that may (i) be implemented along with a head disc assembly, (ii) be implemented without test probes, (iii) provide an on-chip "digital oscilloscope" to monitor writer output waveform, (iv) use sensed waveform with software to set up optimal overshoot time/amplitude values and to assess writer performance, (v) ease chip test and customer drive debug and permit head-by-head parametric optimization without recourse to external instrumentation, (vi) provide a self-contained method of monitoring writer output waveshape for fast-risetime writers, (vii) implement primitive sampled digital oscilloscope capability permitting examination of periodic waveforms occurring at the input of the head-to-preamplifier interconnect, (viii) provide functionality attained through a combination of a software process, (ix) be implemented with minimum extra circuitry incorporated into the preamplifier, and/or (x) be implemented in a cost effective manner.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
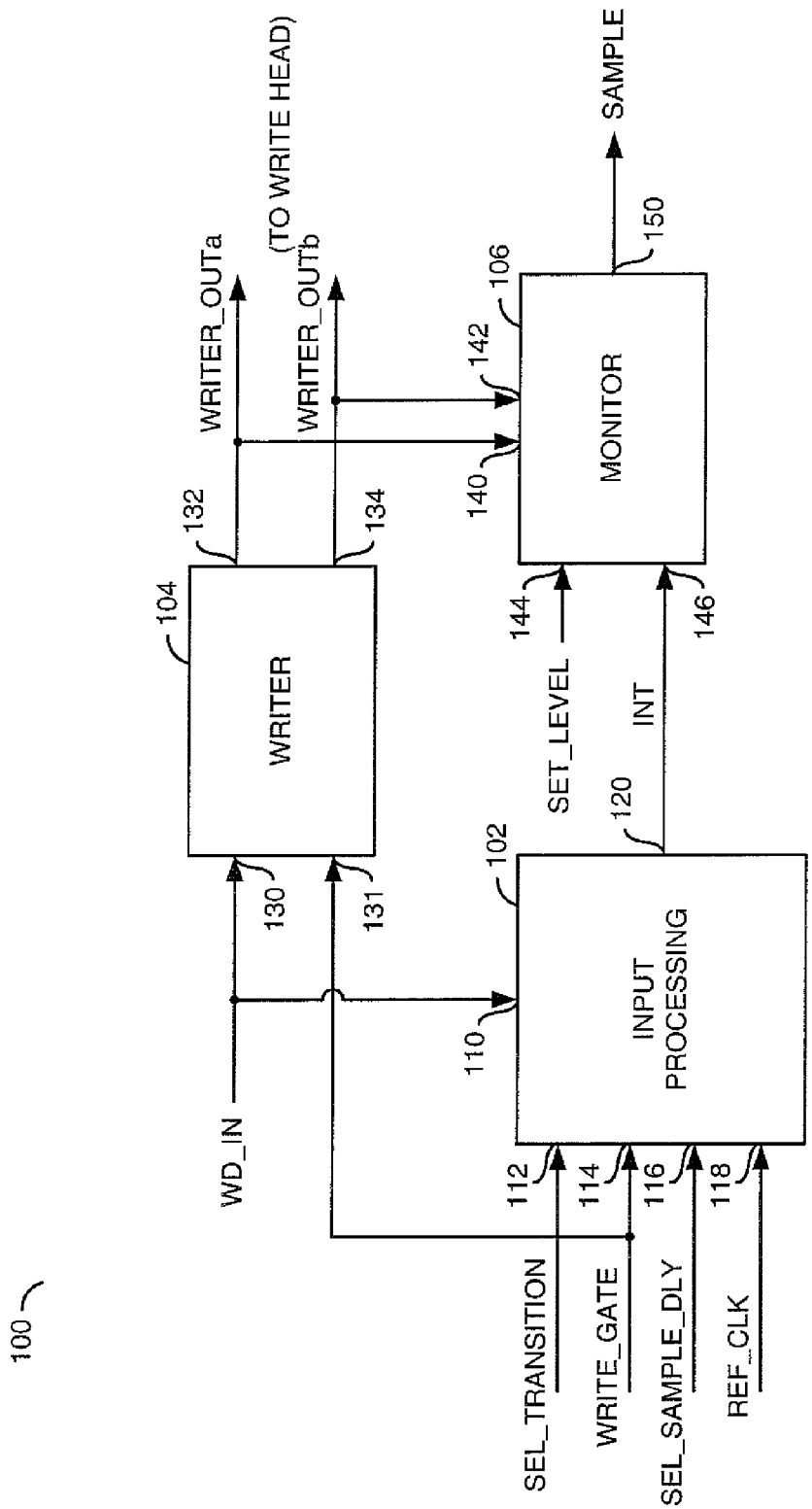
FIG. 1 is a block diagram of a write waveform monitor in accordance with the present invention.

Referring to FIG. 1, a diagram of a circuit 100 is shown in accordance with a preferred embodiment of the present invention. The circuit 100 generally comprises a block (or circuit) 102, a block (or circuit) 104, and a block (or circuit) 106. The circuit 102 may be implemented as an input processing circuit. The circuit 104 may be implemented as a write circuit. The circuit 106 may be implemented as a monitor circuit. The circuit 102 may have an input 110 that may receive a signal (e.g., WD_IN), an input 112 that may receive a signal (e.g., SEL_TRANSITION), an input 114 that may receive a signal (e.g., WRITE_GATE), an input 116 that may receive a signal (e.g., SEL_SAMPLE_DLY), an input 118 that may receive a signal (e.g., REF_CLK), and an output 120 that may present a signal (e.g., INT). The circuit 104 may have an input 130 that may receive the signal WD_IN, an input 131 that may receive the signal WRITE_GATE, an output 132 that may present a signal (e.g., WRITER_OUTa) and an output 134 that may present a signal (e.g., WRITER_

OUTb). The circuit 106 may have an input 140 that may receive the signal WRITER_OUTa, an input 142 that may receive the signal WRITER_OUTb, an input 144 that may receive a signal (e.g., SET_LEVEL), an input 146 that may receive the signal INT and an output 150 that may present a signal (e.g., SAMPLE).

The signal SEL_TRANSITION may be implemented as a signal configured to select a particular transition. The signal WRITE_GATE may be a signal configured to activate a write process by enabling a portion of the circuit 104. The signal SEL_SAMPLE_DLY may be a signal configured to select a sample delay time. The signal REF_CLK may be a reference clock signal. The signal REF_CLK may oscillate at a predetermined and/or fixed frequency. The signal SET_LEVEL may be used to select a transistor threshold level that triggers the monitor circuit 106. The signal WRITER_OUTa and WRITER_OUTb may be control signals presented to a storage system. In one example, the storage system may be a magnetic storage system. In another example, the storage system may be an optical storage system. The signal SAMPLE may be a waveshape representative of a value of the write head signals WRITER_OUTa and WRITER_OUTb relative to a programmable variable reference signal at a programmable time instant. The circuit 102, the circuit 104 and the circuit 106 may be implemented on a single integrated circuit. In general, the circuit 102, the circuit 104 and the circuit 106 may be implemented on a circuit that may normally be used by the writer to a magnetic or an optical system. The signals SEL_TRANSITION and SEL_SAMPLE_DLY may be configurable parameters. The signal WRITE_GATE may be asserted to cause the circuit 104 to write to the magnetic medium.

Figure 2:
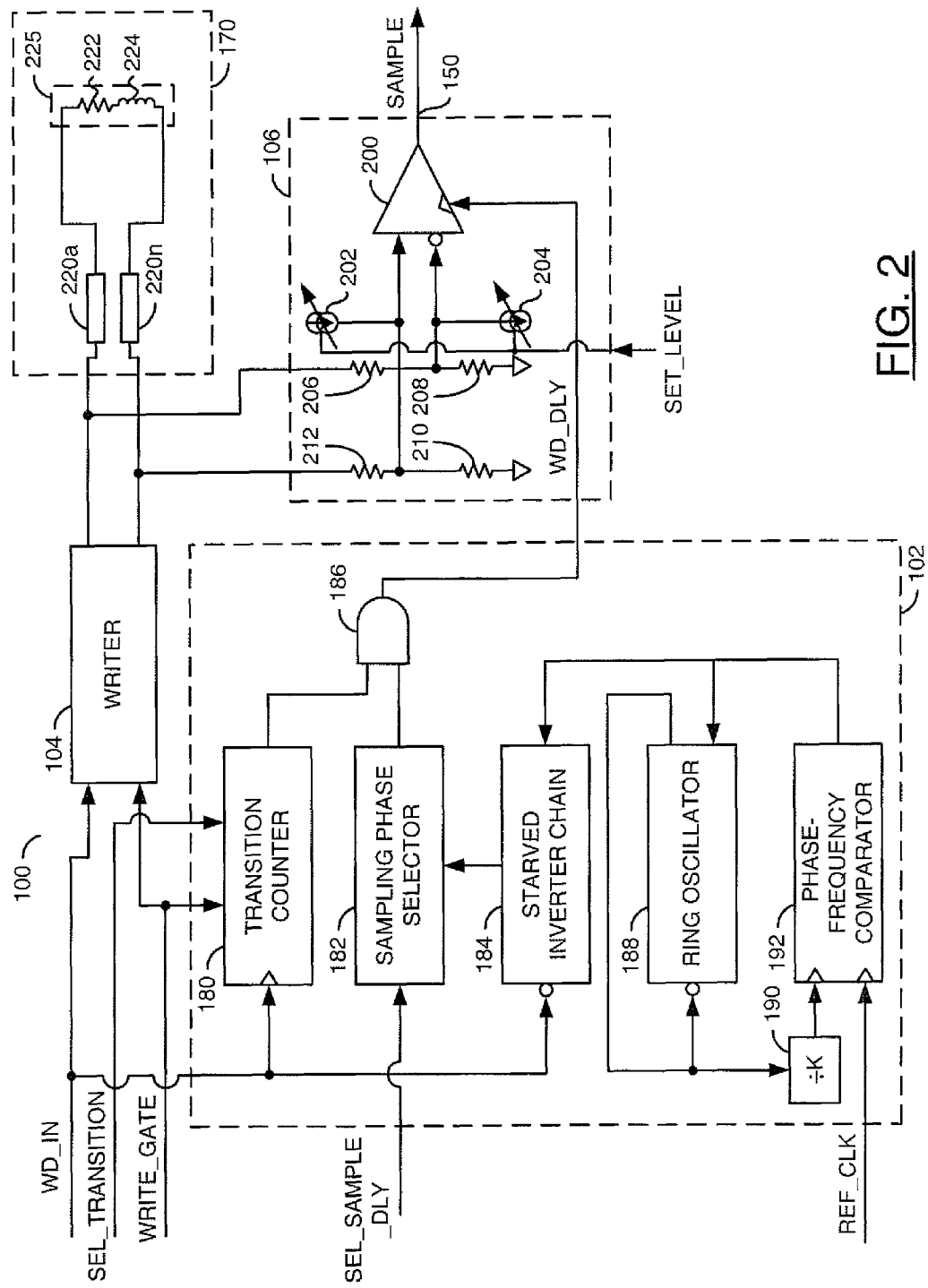
FIG. 2 is a more detailed diagram of the system of FIG. 1.

Referring to FIG. 2, a more detailed diagram of the system 100 is shown. The circuit 100 is shown connected to a block (or circuit) 170. The circuit 170 may represent a write head and associated FOS transmission line interconnect. The circuit 170 may be implemented in a magnetic storage, a magneto-optical storage system, an optical storage system (e.g., through a laser diode), or other type of storage system that may accomplish inscribing data by an electrical signal. The circuit 102 generally comprises a block (or circuit) 180, a block (or circuit) 182, a block (or circuit) 184, a block (or circuit) 186, a block (or circuit) 188, a block (or circuit) 190 and a block (or circuit) 192. The circuit 180 may be implemented as a transition counter circuit. The circuit 182 may be implemented as a sampling phase selector circuit. The circuit 184 may be implemented as a starved inverter chain circuit. The circuit 186 may be implemented as a logic gate. In one example, the circuit 186 may be implemented as an AND gate. The circuit 188 may be implemented as a ring oscillator circuit. The circuit 190 may be implemented as a divider circuit. The circuit 192 may be implemented as a phase-frequency comparator circuit. The circuit 192 may also include a charge pump, a lead-lag circuit and/or an integration loop filter.

The circuit 106 generally comprises a block (or circuit) 200, a block (or circuit) 202, a block (or circuit) 204, a resistor 206, a resistor 208, a resistor 210 and a resistor 212. The circuit 170 may include a number of transmission lines 220a-220n, a resistor 222 and an inductor 224. The resistor 222 and the inductor 224 may be implemented in a series to form a write head 225. A flex-on-suspension (FOS) transmission line may join the write head 225 to the writer circuit 104. Additional shunt capacitors (not shown) may bridge the write head 225. The circuit 200 may be implemented as a strobed comparator circuit. The comparator 200 may have inputs connected to a voltage divider network made up of the resistors 206, 208, 210 and 212. The current sources 202 and 206 may be implemented as programmable-intensity current sources having intensities set by the signal SET_LEVEL. The current sources 202 and 204 may be used to inject currents into the voltage divider network to allow a trip point of the comparator 200 to be programmably set. The circuit 106 may receive a signal (e.g., WD_DLY) from the circuit 102.

The writer circuit 104 may be constructed in accordance with known techniques. However, other methods may be used to meet the design criteria of a particular implementation. The writer circuit 104 may receive write data via the signal WD_IN from a recording channel. The writer block 104 may deliver write current over the transmission lines 220a-220n to the write head 170. While one write had 170 has been described, a number of write heads 170 may be implemented. If more than one write head is implemented, the number of transmission lines 220a-220n is normally increased. The transmission lines 220a-220n normally run in parallel to control one or more of the write heads 170.

The circuit 100 may operate on the principle of a sampling oscilloscope. The circuit 100 may capture a sequence of amplitude samples of a periodic waveform taken at successively later times. The amplitude samples may provide information necessary to reconstruct the write waveform.

Programmably delayed write data edges may be used to initiate write waveform sampling to reduce and/or eliminate sub-nanosecond issues on the write gate data timing. The delayed write data edges may be emitted from the AND gate 186, the control sampling in sampler/comparator 106. The NAND gate 186 may merge the output of the 'vernier'/sampling phase selector 182, with the output of 'coarse' transition counter 180 to permit sampling of a programmable transition to a very fine time increment, say 5-20 ps resolution. The blocks 180 and 182 thus cooperate to afford capability of sampling over a wide transition count, with fine time resolution. Fine delay resolution (e.g., 5 ps) may be achieved by using, for example, a ring-oscillator based phase lock loop 182 having a replica invertor chain 184 located in proximity to the master ring oscillator 188. Loop reference frequency may be applied from external circuitry via the signal REF_CLK. The monitor circuit 106 of the serial port clock pin may be multiplexed to supply the signal REF_CLK (to be described in more detail in connection with FIG. 4). Because clock coupling in the monitor circuit 106 is of concern only during read operations, the clock signal REF_CLK may be active during a write operation.

A phase lock loop formed by the blocks 188, 190 and 192 may employ a sequential phase/frequency comparator and charge pump working into a lead-lag plus integral compensator of the block 192. An optional divide by K (e.g., ÷K) circuit 190 may be implemented between the master ring oscillator 188 and the phase/frequency comparator 192. The circuit 190 may allow the frequency of the signal REF_CLK to be scaled down for ease of transmission. Varying the frequency of the signal REF_CLK frequency may provide interpolation capability. Capture resolutions may be as low as 5 ps. In one example, the minimum delay for oscillator ring oscillator stage may be between 10 ps to 20 ps. However, other delays may be implemented. Write data may pass through the replica invertor chain 184 from which a programmable selector may tap from a particular delay.

The transition counter 180 and the coincidence gate 186 may provide write data transitions until a selectable count is reached. For example, the transition counter 180 may cooperate with the output of the circuit 182 to present the signal WD_DLY to the circuit 106 during each assertion of the signal WRITE_GATE. Such a sample may occur after an integral number of write data transitions are tracked by the transition counter circuit 180. A vernier location may be specified by the sampling phase selector circuit 182. Such a count may be counted either positive or negative edge transitions. A single trigger may be delivered via the signal WD_DLY to the strobe latched comparator 200. The comparator 200 may be implemented as a low-aperture-uncertainty design which may receive inputs from the resistors 206, 208, 210 and 212. In one example, the comparator 200 may be implemented as a strobed comparator 200. However, other comparators may be implemented to meet the design criteria of a particular implementation.

In one example, the resistors 206, 208, 210 and 212 may be configured as a voltage divider. In another example, the resistors 206, 208, 210 and 212 may have an equivalent function as needed to attenuate high amplitude write voltage to a level compatible with a SiGe/CMOS construction of a comparator. The variable current sources 202 and 204 may be programmable to a particular target accuracy. For example, a 6-bit accuracy of the signal SET_LEVEL may be implemented to establish a trip point of the comparator 200.

To acquire a particular waveform trace, drive firmware may set up a write data pattern on the signal WD_IN. Drive firmware may choose a specific transition to be examined by the transition counter circuit 180. The firmware may then select fine delay steps in the sampling phase selector block 182 to vary the position of the sample-control signal 186B. The current sources 202 and 204 may be varied in successive approximation until the comparator 200 trips. A digital code may be applied to provide a set level to the current sources 202 and 204 when the trip is activated and may then identify the value of the write voltage at HWP, HWN to within a constant known scalefactor.

Figure 3:
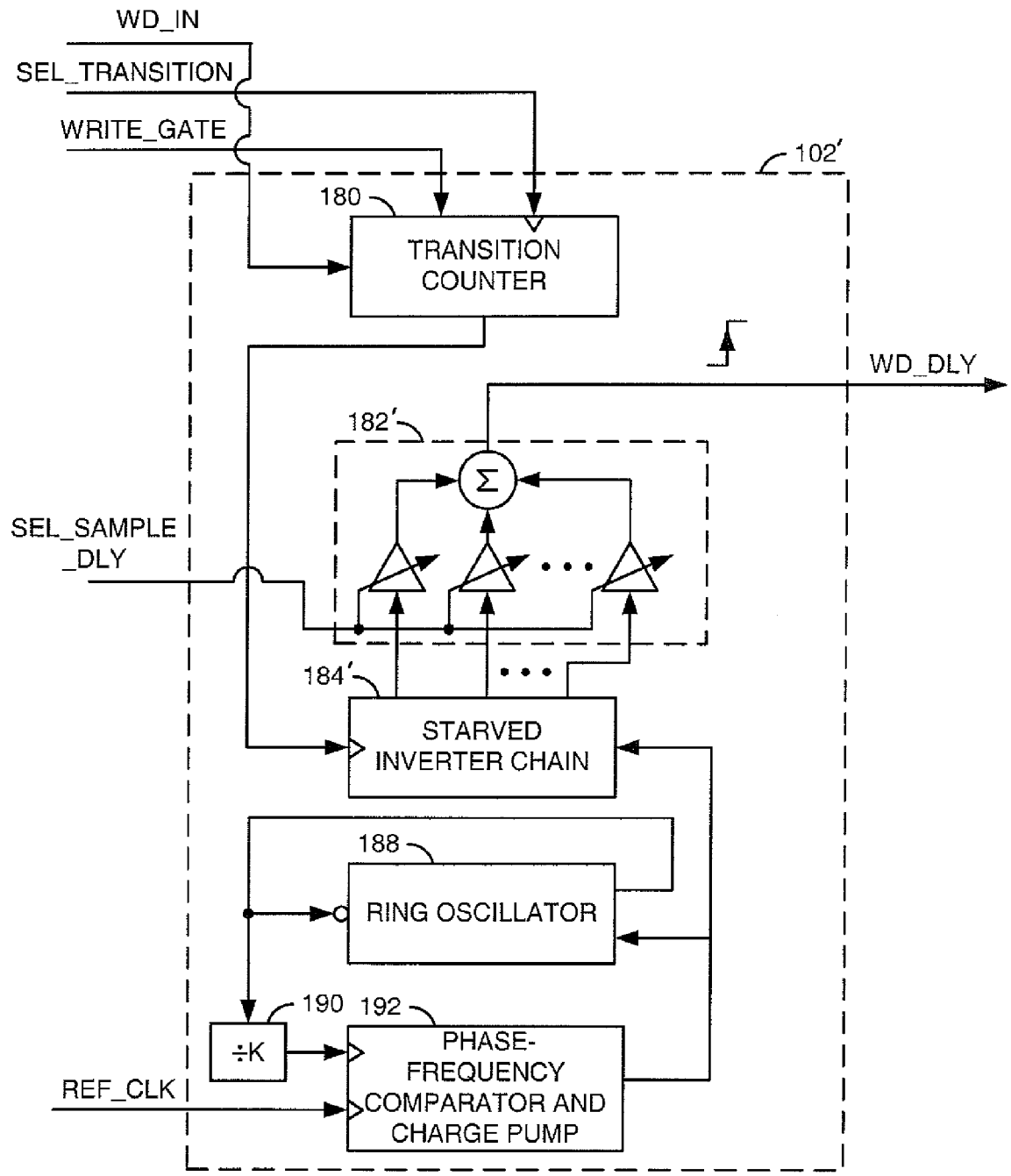
FIG. 3 is an alternative implementation of the input processing circuit of FIG. 1.

Referring to FIG. 3, an alternative implementation of the circuit 102' is shown. An alternative vernier time selector choice may be implemented for the circuit 182' and the circuit 184'. The circuit 182' may be implemented as a phase interpolator which may receive multiple phases from the starved inverter chain circuit 184 and the controlling phase locked loop formed by the circuit 188, the circuit 190 and the circuit 192. The phases may be mixed in varying proportion by the signal SEL_SAMPLE_DELAY to obtain a programmable phase signal at the output 186. The transition counter circuit 180 may count transitions of the signal WD_IN upon assertion of the signal WRITE_GATE. The transition counter circuit 180 may also issue a single edge on the signal WD_DLY when a count prescribed by the value of SEL_TRANSITION is attained. The edge may propagate down the starved invertor chain circuit 184. The outputs of the circuit 184 may be mixed in varying proportion in the phase interpolator circuit 182 to achieve a vernier-delayed signal WD_DLY.

The advantage of the approach shown in FIG. 3 relative to FIG. 2 is that the signal REF_CLK shown in FIG. 3 may now be a constant frequency since delay selection is interpolated between the invertors of the circuit 184 rather than relying on the absolute delay of the inverters. Further, because of interpolation, the number of invertors in the chains 184 and 188 may be reduced.

Figure 4:
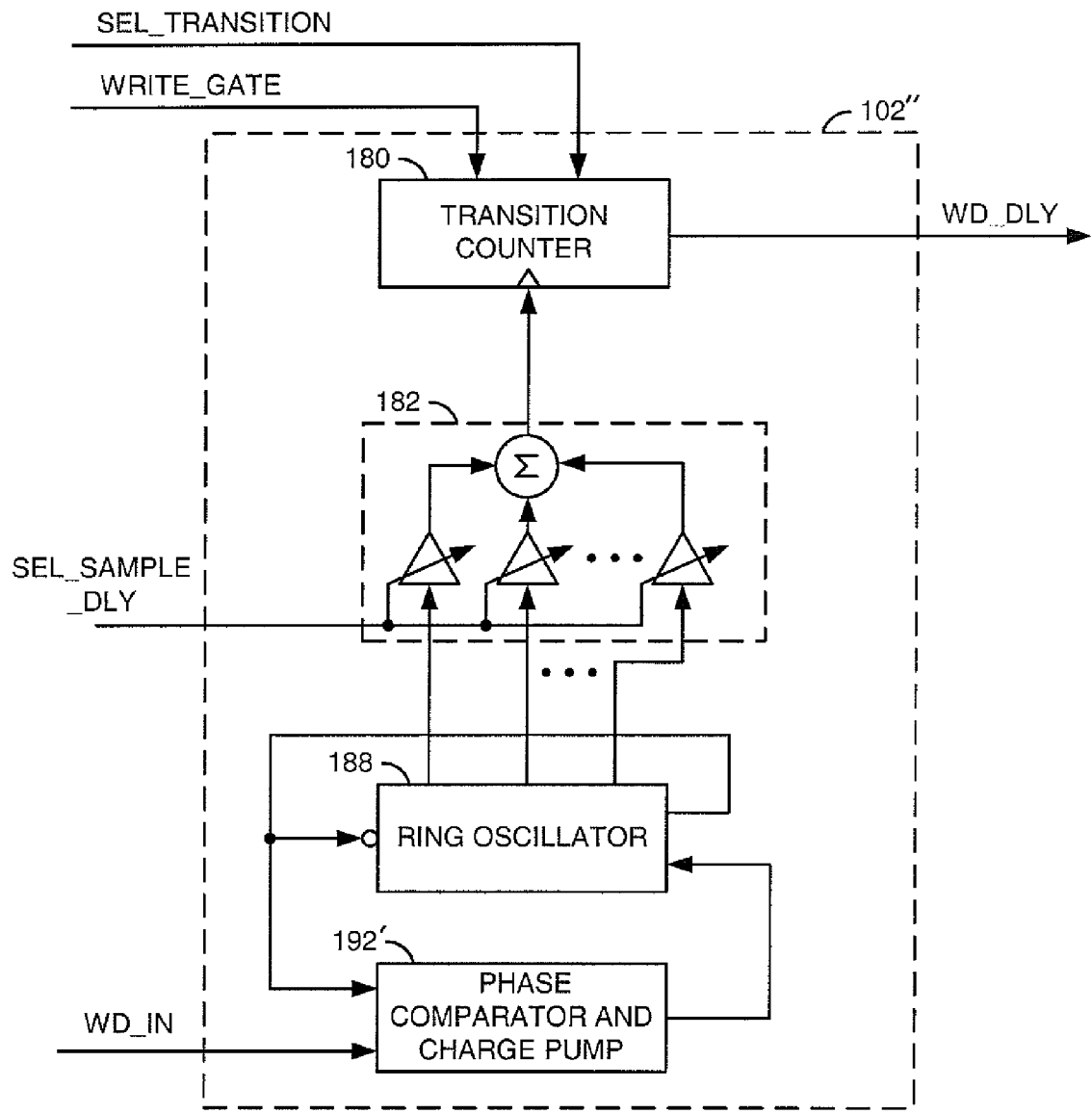
FIG. 4 is another alternative implementation of the input processing circuit of FIG. 1.

Referring to FIG. 4, an alternate implementation of the circuit 102" is shown. The circuit 102" may be self-clocked in response to the signal WD_IN. The circuit 102''' may be implemented without an external clock signal. The phase-frequency comparator circuit 192 shown in FIG. 2 and FIG. 3 is replaced by a phase-comparator and charge pump circuit 192'. The circuit 192' may respond to varying—T-spaced transitions on the signal WD_IN. The circuit 192' (along with the ring oscillator circuit 182) may produce a baud-rate tone corresponding to the signal WD_IN. The phase comparator 192' may be implemented in a number of ways. For example, a Hogge (or Alexander) type circuit may be implemented to permit synchronization to a variable-space transition stream when the transitions occur at integer multiples of the oscillator frequency. The phase interpolator circuit 182 may receive inputs from the invertor stages of the ring oscillator 188. The transition counter 180 may count a predetermined number of variable-phase clocks emitted by the phase interpolator 182. The transition counter 180 may also assert the signal WRITE_ GATE and emit a sample transition on the signal WD_DLY. The circuit 102" may eliminate the need for the signal REF_ CLK since sampling is self-timed by the data. The transition counter 180 may tally interpolated ring oscillator pulses directly to determine a comparator strobe timing.

Figure 5:
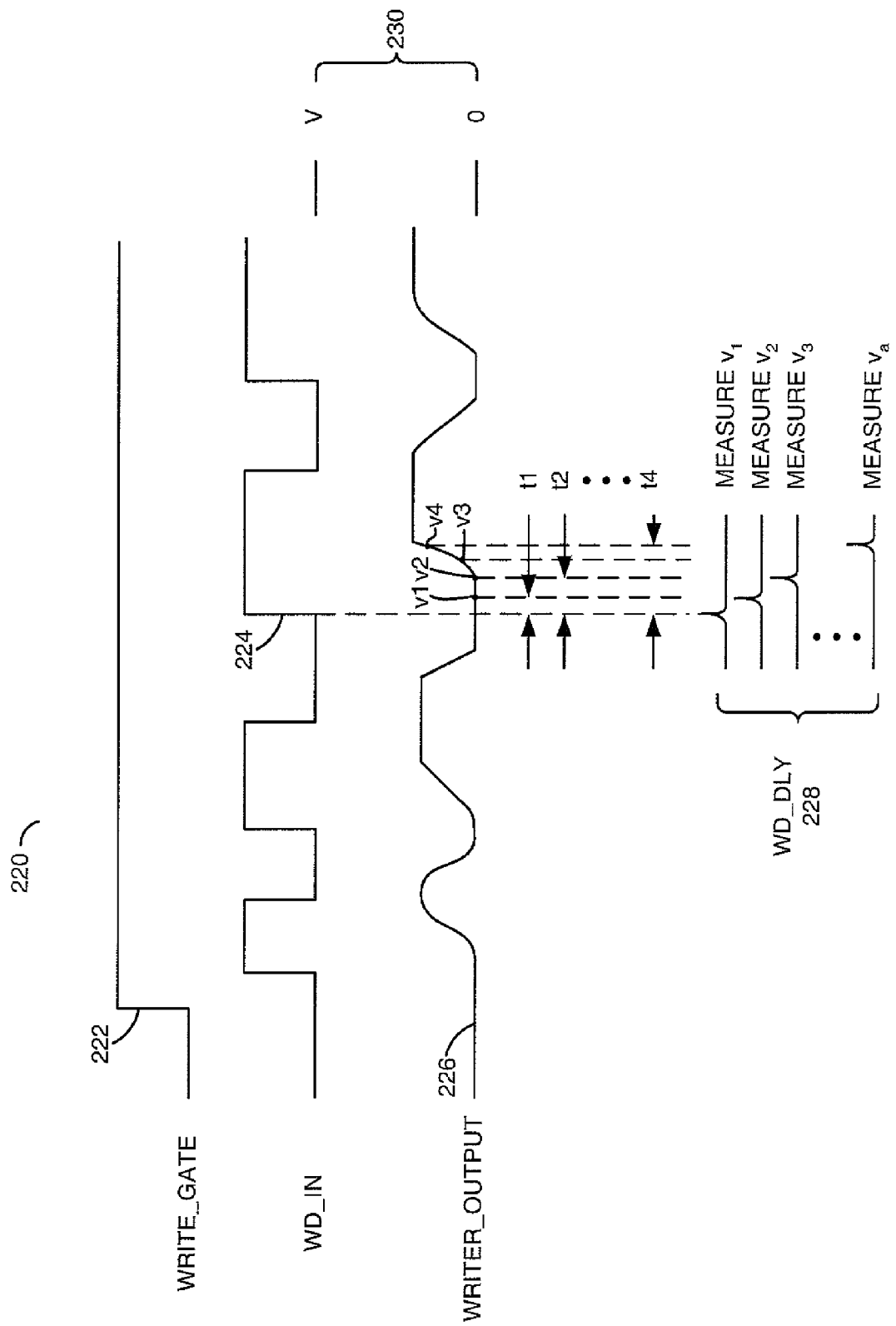
FIG. 5 is an example of a write data pattern.

Referring to FIG. 5, a diagram 220 illustrating write data pattern of the signal WD_IN is shown. In FIG. 5, a transition count of three is shown as 224. Transition counting may be initiated by the rise of the signal WRITE_GATE at instant 222. At 226, the signal WRITER_OUTPUT may be digitized. The signal WRITER_OUTPUT generally lags the signal WD_IN due to propagation delay through the writer circuit 104. At the portion 228, the signal WD_DLY is shown corresponding to a sequential interrogation at the output of the writer circuit 104 for four sample instants denoted as levels v1-v4, occurring at delays t1-t4, respectively. After each sample has been processed, the signal SEL_SAMPLE_DELAY may be advanced to cause the strobe to progress through the writer circuit 104 output edge under examination. The output level of the writer circuit 104 may be bounded by voltage levels 0 and V shown as 230.

Figure 6:
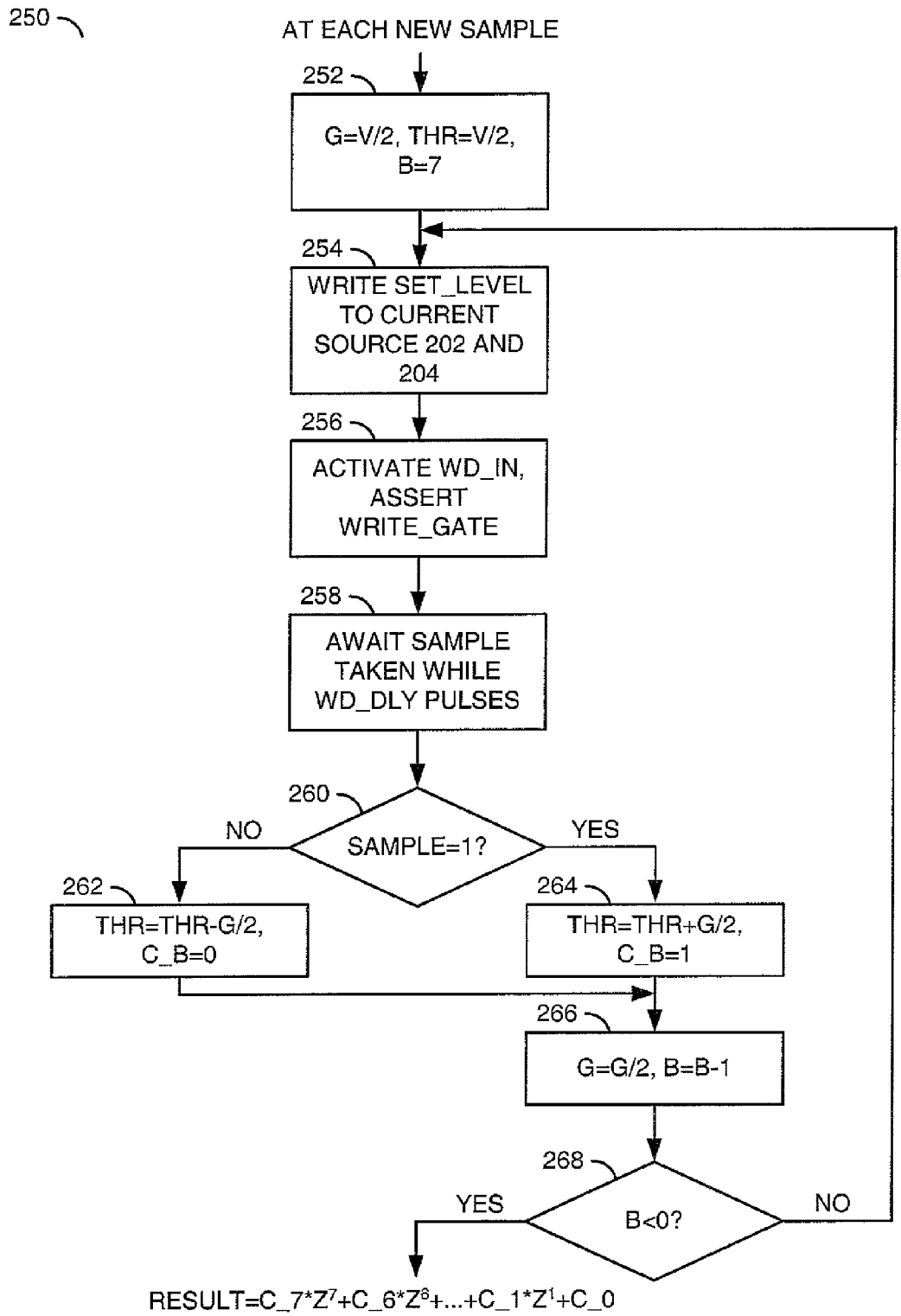
FIG. 6 is a flowchart implementing a method for waveform averaging and/or noise reduction.

Referring to FIG. 6, a flowchart implementing a method 250 for implementing capture of a waveform by successive approximation is shown. The method 250 may be repeated with the resulting samples taken at the same time-point averaged to implement noise reduction. The method 250 generally comprises a step (or state) 252, a step (or state) 254, a step (or state) 256, a step (or state) 258, a decision step (or state) 260, a step (or state) 262, a step (or state) 264, a step (or state) 266, and a decision step (or state) 268. The step 256 may set one or more initial values. The step 254 may write the signal SET_LEVEL to the current source 202 and 204. The step 256 may activate the signal WD_IN and may assert the signal WRITE_GATE. The step 256 may await a sample taken while the signal WD_DLY pulses. The decision step 260 may determine if the value SAMPLE is equal to one. If so, the method 250 may move to the state 264. If not, the method 250 may move to the state 260. The states 262 and 264 may reinitialize the signal THR. Next, the state 266 may reinitialize the signal G and the signal B. Next, the state 268 may determine if the value B is less than zero. If so, the method 250 presents an output result as shown. If not, the method 250 returns to the state 254. The notation L_B generally refers to the coefficient associated with each bit B.

At each sample time selection an iterative process in drive firmware may be necessary to digitize sample amplitude. The signal SET_LEVEL may denote the trip-point of the comparator 200 as set by the intensity of current sources 202 and 204. The signal SAMPLE, which may be set to values 0 or 1, may denote the polarity of the comparator 200 output signal. The variable B may be a bit-number indicator. The variable G may be the successive-approximation trial voltage. The method 250 illustrates an eight-bit successive-approximation. However, other methods may be implemented to meet the criteria of a particular implementation.

The method 250 may be executed for each sample-time step. The variable B may be a bit index. The variable C_B may denote the bit position 2^B in the assembled result. If a multi-level ADC-based sampler (to be shown in more detail in connection with FIG. 7) is employed, then no iterative amplitude-determination sequence may be necessary since the sample voltage indication is produced in a single sample operation. If adequate delay range is provided, a succession of transitions may be reconstructed.

The steps of the method 250 may be repeated for successively delayed sampling strobes that may build up a representation of the write data voltage waveform appearing on the HWP and HWN pins describing a sequence of (Vk, Tk) pairs described of the waveform. Waveform averaging and/or noise reduction may be applied by averaging multiple samples at each sample step and/or by averaging multiple instances of the voltage versus time vector.

Figure 7:
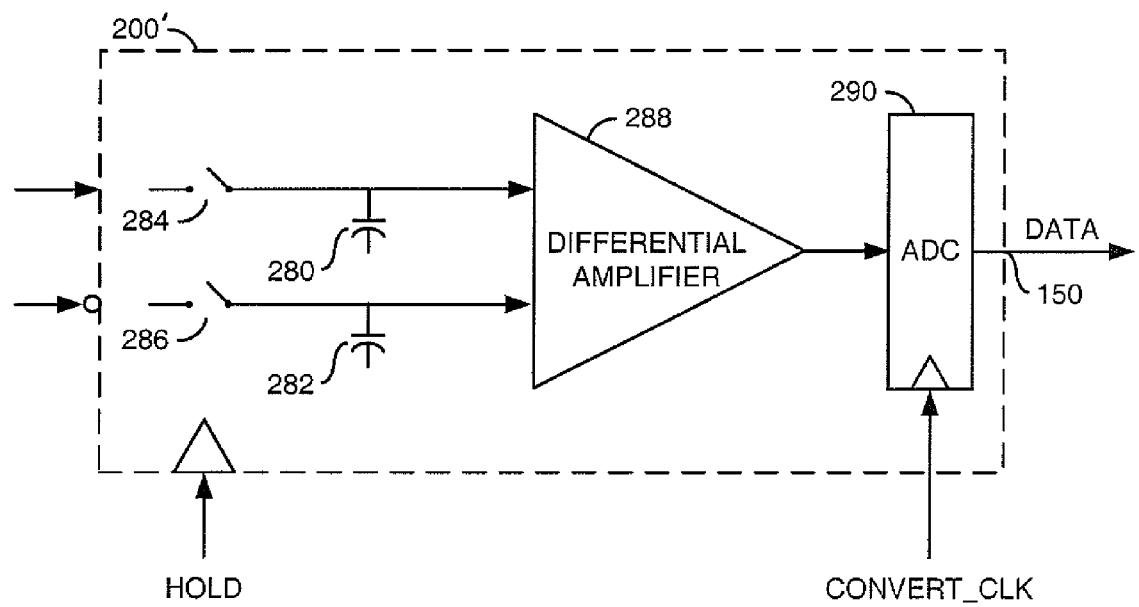
FIG. 7 is a diagram illustrating an alternate implementation of the comparator of FIG. 2.
Figure 7:
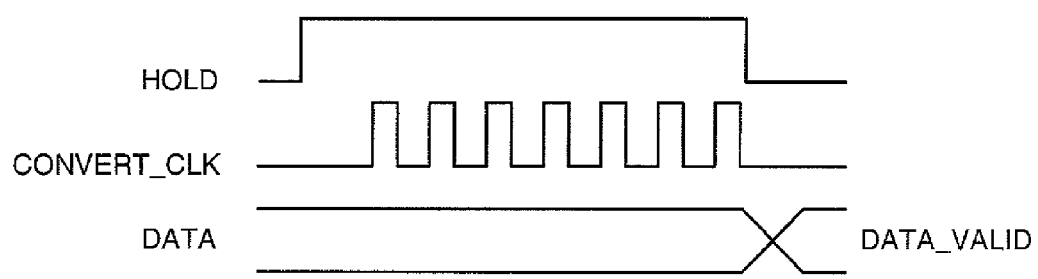

Referring to FIG. 7, an alternative implementation of the comparator 200' is shown. The comparator 200' may be implemented as a high speed sample-hold circuit followed by an analog-to-digital convertor (ADC). To achieve long hold times simultaneous with small aperture uncertainty, the differential amplifier 288 and the holding circuit 290 may alternatively be implemented as a cascade of two hold circuits, the second of which may provide a long-time-hold capability. The circuit 200' generally comprises a capacitor 280, a capacitor 282, a switch 284, a switch 286, an operational amplifier circuit 288 and an analog to digital converter (ADC) circuit 290. The circuit 200' may receive the signal HOLD. The switch 284 and the switch 286 may be implemented as high-speed gates having low aperture uncertainty (e.g., uncertainty of sample instant). In one example, the circuit 288 may be implemented as a differential amplifier circuit preceded by a low aperture uncertainty hold circuit. The gates 284 and 286 may capture the scaled writer output voltage on the capacitors 280 and 282. The voltage on the capacitors 280 and 282 may be differenced in a comparatively slow amplifier and made available on the output 150 as the signal SAMPLE. The signal SAMPLE may represent an ADC commonly provided in the operational amplifier circuit 288 for diagnostic purposes. The circuit 200' may avoid the need to implement drive code to iteratively seek the trip point of the comparator 200 (or 200'). The ADC 290 may receive the signal CONVERT_CLK and may present the output signal DATA.

Although the circuit 100 has been described in reference to writer output voltage sensing, the circuit 100 may be equally applicable to current sensing if a current sense-point is provided (to be described in more detail in connection with FIG. 9). Due to the high edge rates being measured, the comparator 200 (or 200') may be located in the headcell of the writer 104. The remaining circuits may be located in the preamplifier core and/or shared between headcells.

As an example of quantities involved, consider a design parameter to sample four consecutive bitcells in a system having 4 Gb/s codebit rate, at 10 ps resolution. Thus, a net delay (e.g., 250 ps*4=1 ns) is needed through N stages. The ring oscillator stages may be implemented as starved invertors each capable of a controllable 10 ps to 40 ps delay $\tau_{PD}$ where the number of N stages may be calculated in accordance with the following equation EQ1:

$$N = 1\text{ns}/40\text{ps} = 25 \quad \text{EQ1}$$

In one example, a 130 nm CMOS process may give a 10 ps to 40 ps delay. Ring oscillator frequency (e.g., reference frequency) may be calculated in accordance with the following equation EQ2:

$$f = \frac{1}{2N\tau_{PD}} \quad \text{EQ2}$$

Therefore, to span the range 10 ps to 40 ps per stage, the frequency of the signal REF_CLK (where K=1) normally varies in accordance with the following equation EQ3:

$$500\text{MHz} \leq f \leq 2\text{GHz} \quad \text{EQ3:}$$

In one example, K may be chosen to be K=8 to constrain maximum frequency of the signal REF_CLK transmitted over the single-ended CMOS line M1-8 to 250 MHz.

The relation between per-stage delay and reference frequency may be used to compute the required reference frequency to interpolate sample times between ring counter stage outputs in accordance with the following equation EQ4:

$$\frac{d\tau_{PD}}{df} = -\frac{1}{2Nf^2} \quad \text{EQ4}$$

Firmware may select the appropriate ring oscillator stage and reference clock frequency at each step to obtain progressive 10 ps sampling steps.

Figure 8:
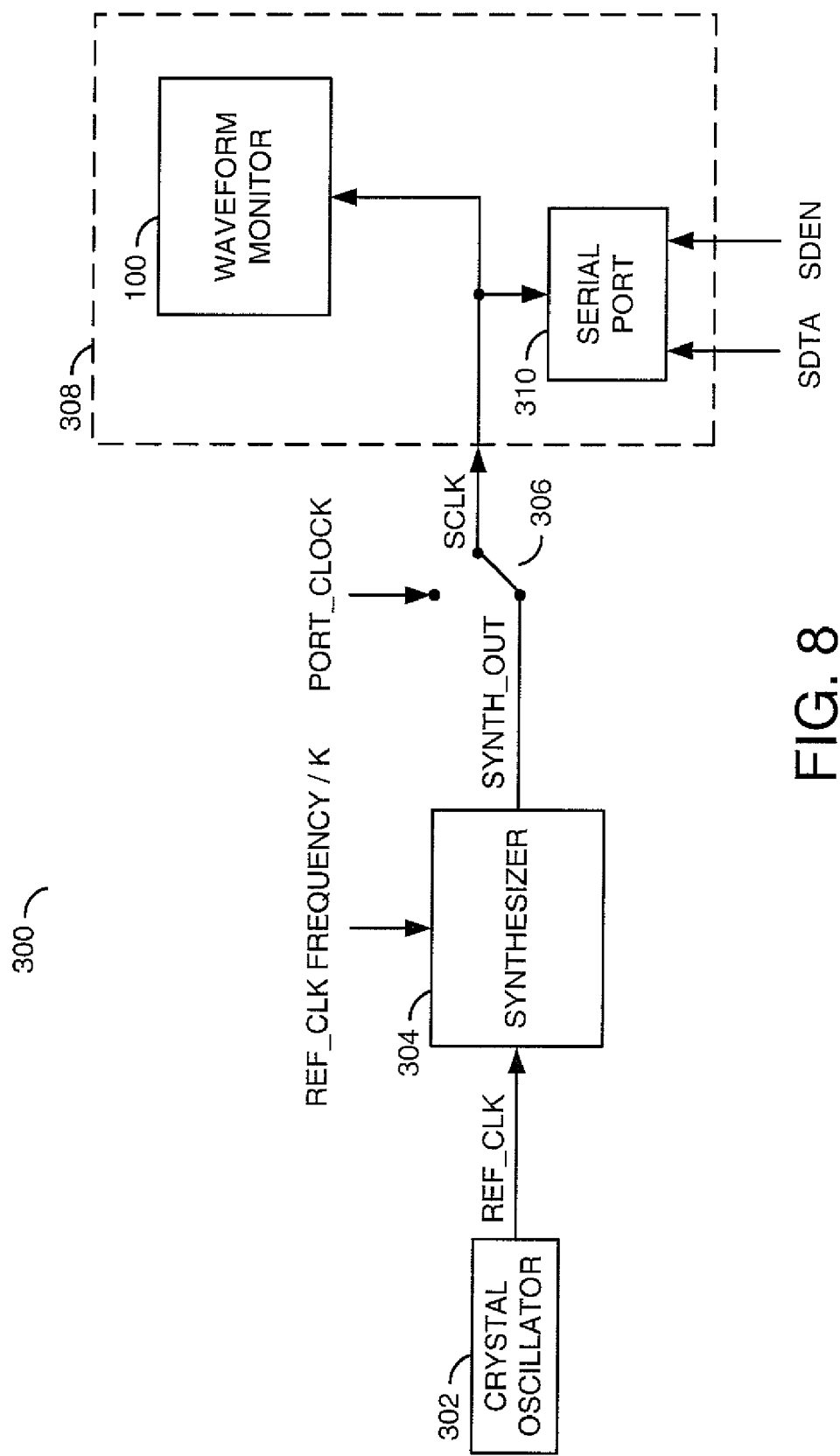
FIG. 8 is a diagram of a circuit for generating a reference clock signal.

Referring to FIG. 8, a circuit 300 for generating the signal REF_CLK is shown. The signal REF_CLK may be multiplexed into a signal (e.g., SCLK) of an existing serial port. Such an implementation may be useful in a system that uses an externally provided reference clock signal. The circuit 300 may comprise a block (or circuit) 302, a block (or circuit) 304, a block (or circuit) 306 and a block (or circuit) 308. The blocks 302 and 204 may be preferably located remotely from the preamplifier (e.g., in the recording channel). The circuit 302 may be implemented as a crystal oscillator circuit. In one example, the circuit 304 may be implemented as a synthesizer circuit. In another example, the circuit 304 may be implemented as a direct digital synthesizer (DDS) circuit. The circuit 306 may be implemented as a switch. The circuit 308 may be implemented as a preamplifier circuit. The preamplifier 308 may comprise the circuit 100 and a block (or circuit) 310. The circuit 310 may be implemented as a serial port. For example, a three-wire serial port may be implemented having a clock signal, a data signal, and a number of enable lines (e.g., SCLK, SDTA, SDEN, etc.). Such an implementation is commonly provided in preamplifiers to permit a set up of a register and/or internal status polling.

The signal REF_CLK may be multiplexed to the waveform monitor 100 over the Serial Port Clock (SPC) line of the preamplifier 308. During the serial port transactions of the preamplifier 308, the switch 306 may be in the upper position. When in the upper position (e.g., when the preamplifier (to be described in more detail in connection with FIG. 10) is being configured by microcode in the drive), the switch 306 may select a fixed-frequency signal PORT_CLOCK for application to the preamplifier SPC pin. The signal PORT_CLOCK may be presented to the serial port 310. During writer waveform monitoring, the switch 306 be in the lower position. When in the lower position, the switch 306 may select the signal SYNTH_OUT presented from the synthesizer 304. The signal SYNTH_OUT may be presented to the waveform monitor 100.

In one example, frequency synthesis from the master crystal oscillator 302 may employ coarse M/N multiplication techniques. In another example, frequency synthesis may employ sigma delta or direct digital synthesis (DDS) methods. The sigma delta and DDS methods are generally capable of higher resolutions. The synthesizer 304 may be located in a recording channel to minimize die area of the preamplifier 308.

The variable frequency of the signal REF_CLK may be used to establish fine-grained sampling phase selection. However, an alternative implementation may use a fixed-frequency of the signal REF_CLK in conjunction with on-chip phase interpolation to refine timing granularity.

Figure 9:
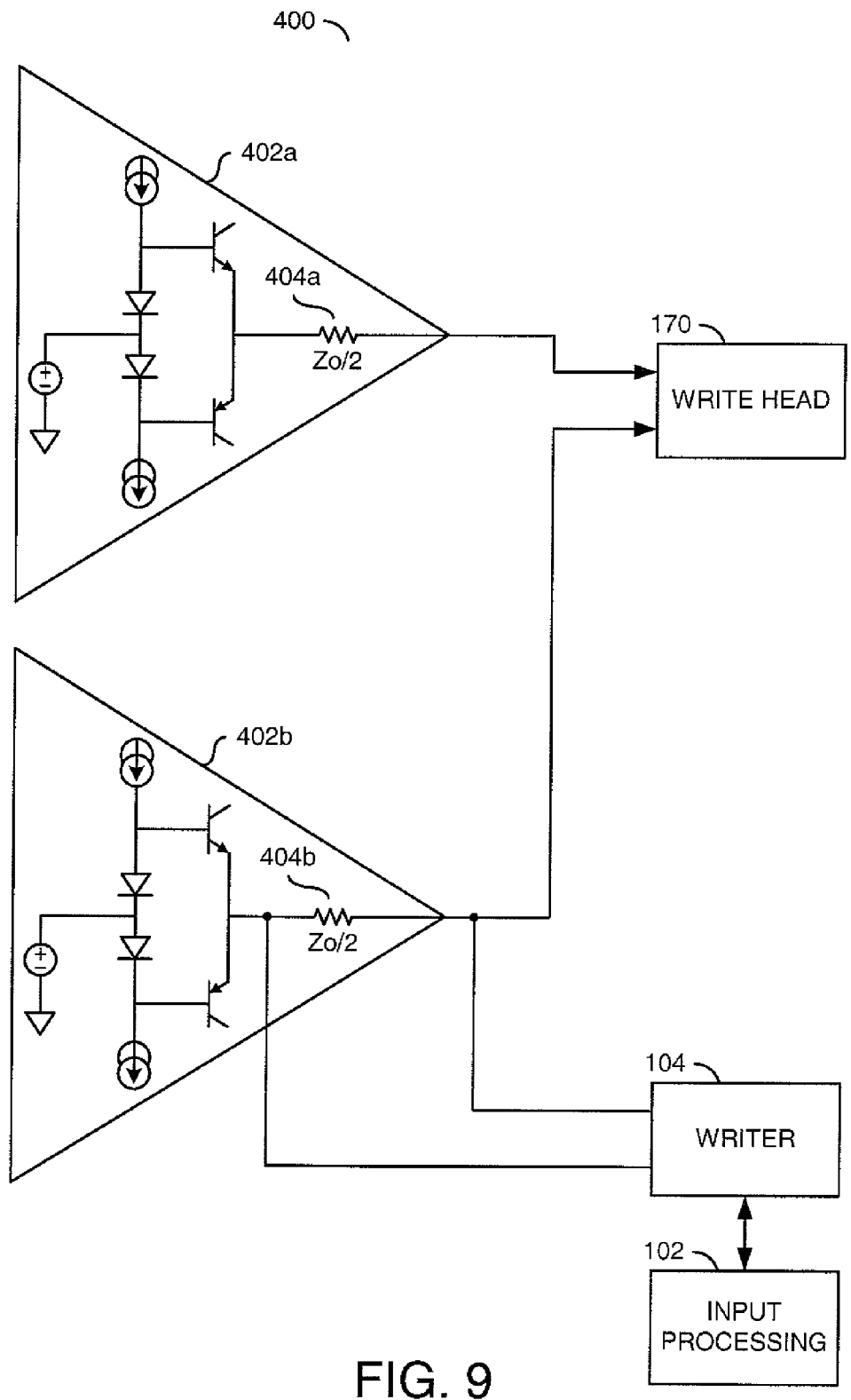
FIG. 9 is a diagram illustrating the monitor in the context of a write assembly.

Referring to FIG. 9, an example of a circuit 400 illustrating an implementation of the present invention is shown. The circuit 400 may be used to sense writer launch current. The circuit 400 may comprise the circuit 102, the circuit 104, the circuit 170 and blocks (or circuits) 402a and 402b. The circuits 402a and 402b may be implemented as complementary buffer circuits. The complementary buffers 402a and 402b may drive terminating resistors 404a and 404b. The resistors 404a and 404b may have a value equal to Zo/2, where Zo is the characteristic impedance of the transmission lines 220a-220n of the circuit 170. The potential drop across one of the resistors 404a and 404b may be sensed as launch current and/or the current level needed for an application of the circuit 100.

Figure 10:
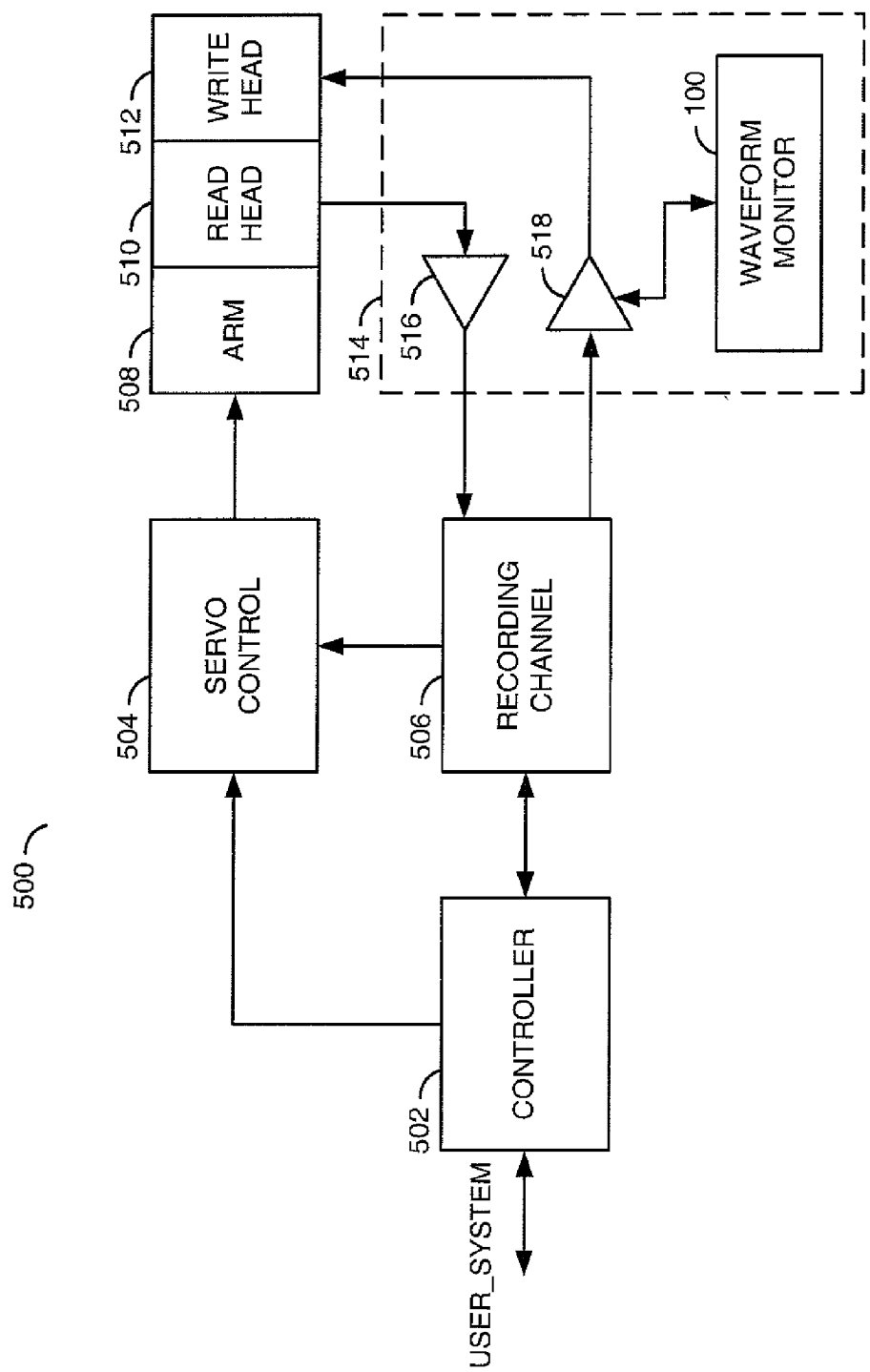
FIG. 10 is a diagram illustrating a magnetic recording system implementing the present invention.

Referring to FIG. 10, a diagram of a magnetic recording system 500 implementing the circuit 100 is shown. The system 500 generally comprises a block (or circuit) 502, a block (or circuit) 504, a block (or circuit) 506, a block (or circuit) 508, a block (or circuit) 510, a block (or circuit) 512 and a block (or circuit) 514. The circuit 502 may be implemented as a controller circuit. The circuit 504 may be implemented as a servo control circuit. The circuit 506 may be implemented as a recording channel circuit. The circuit 508 may be implemented as an arm circuit. The circuit 510 may be implemented as a read head circuit. The circuit 512 may be implemented as a write head circuit. The circuit 514 may be implemented as a preamplifier circuit. The preamplifier circuit 514 may comprise the circuit 100, a block (or circuit) 516 and a block (or circuit) 518. The circuit 516 may be implemented as a reader circuit. The circuit 518 may be implemented as a writer circuit.

The controller circuit 502 may control data transfer and a buffer. The controller circuit 502 may also provide interface to a user via the signal USER_SYSTEM. The servo control circuit 504 may position the arm 508 on a track. The recording channel circuit 506 may encode and/or decode read/write data.

While the invention has been particularly shown and described with reference to the preferred embodiments thereof, it will be understood by those skilled in the art that various changes in form and details may be made without departing from the scope of the invention.

The invention claimed is:

1. An apparatus comprising:
    a write circuit configured to generate one or more write control signals in response to an input signal;
    a processing circuit configured to generate an intermediate control signal in response to (i) said input signal, (ii) a reference clock signal and (iii) one or more user input signals; and
    a monitor circuit configured to generate a sample signal in response to (i) said write control signals and (ii) said intermediate signal, wherein said sample signal (i) represents a waveshape of said write control signals used to monitor writing to a data storage system and (ii) is generated at a sample resolution defined by at least one of said user input signals.

2. The apparatus according to claim 1, wherein said reference clock signal comprises a clock signal oscillating at a predetermined fixed frequency.

3. The apparatus according to claim 1, wherein said one or more user input signals comprise a select transition signal, a write gate signal and a select sample signal.

4. The apparatus according to claim 1, wherein said monitor circuit generates said sample signal in further response to a set level signal.

5. The apparatus according to claim 1, wherein said write control signals are presented to a write head of an optical storage system.

6. The apparatus according to claim 1, wherein said write control signals are presented to a write head of a magnetic storage system.

7. The apparatus according to claim 1, wherein said input signal comprises data configured to be written to a storage medium.

8. The apparatus according to claim 1, wherein said processing circuit comprises a transition counter to provide count write data transitions.

9. The apparatus according to claim 1, wherein said reference clock signal is scaled down for transmission by said processing circuit.

10. The apparatus according to claim 1, wherein frequency of said reference clock signal is varied to provide interpolation capability.

11. The apparatus according to claim 1, wherein said reference clock signal is generated using a direct digital synthesizer.

12. The apparatus according to claim 1, wherein said monitor circuit comprises a voltage divider.

13. The apparatus according to claim 1, wherein said monitor circuit comprises a comparator.

14. The apparatus according to claim 1, wherein said monitor circuit comprises programmable current sources.

* * * * *